(12) United States Patent
Balz

(10) Patent No.: US 10,904,328 B2
(45) Date of Patent: Jan. 26, 2021

(54) SYSTEM, METHOD, AND APPARATUS FOR PROVIDING AND UTILIZING A LINK METADATA SYSTEM FOR THE INTERNET

(71) Applicant: Christopher Balz, Palo Alto, CA (US)

(72) Inventor: Christopher Balz, Palo Alto, CA (US)

( * ) Notice: Subject to any disclaimer, the term of this patent is extended or adjusted under 35 U.S.C. 154(b) by 396 days.

(21) Appl. No.: 15/365,946

(22) Filed: Dec. 1, 2016

(65) Prior Publication Data
US 2017/0163729 A1    Jun. 8, 2017

Related U.S. Application Data

(60) Provisional application No. 62/262,898, filed on Dec. 3, 2015.

(51) Int. Cl.
*H04L 29/08*    (2006.01)
*H04L 29/12*    (2006.01)

(52) U.S. Cl.
CPC ...... *H04L 67/1095* (2013.01); *H04L 61/1511* (2013.01); *H04L 67/02* (2013.01)

(58) Field of Classification Search
CPC ... H04L 67/1095; H04L 61/1511; H04L 67/02
See application file for complete search history.

(56) References Cited

U.S. PATENT DOCUMENTS 6,826,594 B1 * 11/2004 Pettersen ............... H04L 29/06
709/203
8,065,720 B1 * 11/2011 Ebrahimi ............ H04L 63/1483
27/28
2002/0087707 A1 * 7/2002 Stewart ................. H04L 29/06
709/230
2006/0026013 A1 * 2/2006 Kraft .................. G06F 16/9535
705/1.1
2008/0005342 A1 * 1/2008 Schneider ......... H04L 29/12594
709/230
2011/0246634 A1 * 10/2011 Liu ................... H04L 29/12066
709/223
2012/0278889 A1 * 11/2012 El-Moussa .......... H04L 63/1425
726/23
2013/0205018 A1 * 8/2013 Rahman ............. H04L 12/2809
709/224
2015/0154156 A1 * 6/2015 Meyers, Jr. ......... G06F 17/2235
715/205

* cited by examiner

*Primary Examiner* — Viet D Vu
(74) *Attorney, Agent, or Firm* — Bryan Fibel

(57) ABSTRACT

System, method, and apparatus are described for enabling the lookup of metadata about navigational links on the Internet, from a centralized system. The present invention offers a Link Metadata System ("LMS"), available on the Internet, of information associated with any given, specific Internet domain and URL or URI path combination (the "link"). Software browsing user agents are then configured with the ability to request information from the LMS and perform actions based on the received information which can include navigation. The invention provides for, upon navigational action by a user on a link on a client web browser, sending a request for information to a lookup server, looking up information, using the link, in a lookup server and receiving, from the lookup server, a response with a payload of the requested information.

16 Claims, 3 Drawing Sheets

SYSTEM, METHOD, AND APPARATUS FOR PROVIDING AND UTILIZING A LINK METADATA SYSTEM FOR THE INTERNET

CROSS REFERENCE TO RELATED APPLICATIONS

This application claims priority from a provisional U.S. patent application No. 62/262,898 filed on Dec. 3, 2015.

FIELD OF THE INVENTION

Embodiments of the invention generally relate to navigational links on the World Wide Web. Embodiments of the invention specifically relate to looking up metadata corresponding to a link from a centralized system and utilizing the metadata.

BACKGROUND

Hyperlinks ("links") that are based on a domain name, such as example.com, are looked up by user agents (such as Web browsers) in order to find the Internet Protocol ("IP") address where they are located. This action, which is enabled by the Domain Name System ("DNS"), necessarily happens by definition before the desired resource can be accessed. Thus, this lookup of the location of a domain name is critical to the functioning of the World Wide Web. However, as the Web has grown in importance and in the variety of its use-case scenarios, so has the need for providing metadata, in addition to the essential location information provided by DNS.

SUMMARY

System, method, and apparatus are described for enabling the lookup of metadata about navigational links on the Internet, from a centralized system. The present invention offers a Link Metadata System ("LMS"), available on the Internet, of information associated with any given, specific Internet domain and URL or URI path combination (the "link"). Software browsing user agents are then configured with the ability to request information from the LMS and perform actions based on the received information which can include navigation.

The invention provides for, upon navigational action by a user on a link on a client web browser, sending a request for information to a lookup server, looking up information, using the link, in a lookup server and receiving, from the lookup server, a response with a payload of the requested information. The user on the client web browser can include a human user or a search engine web crawler. The request for information can be an http get request. The lookup server can reside on the same physical or virtual computer as a DNS server. The lookup server can be integrated programmatically into a DNS server, or vice-versa.

A Link Metadata server apparatus comprises at least one processor, a registry of link addresses, each link address associated with a set of information, wherein a request from a client for link information is looked up in the registry. The apparatus can further comprise a means for sending the looked-up link information to the client. Additionally, a DNS server can be included resident on the apparatus. Further a DNS server can be integrated programmatically on the apparatus. The request from a client can be an http get request.

DETAILED DESCRIPTION

Reference will now be made in detail to the present embodiments discussed herein, illustrated in the accompanying drawings. The embodiments are described below to explain the disclosed system, method, and apparatus by referring to the Figures using like numerals. It will be nevertheless understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of systems and program modules. Those skilled in the art will recognize that other implementations may be performed that may include different data structures, components, or routines that perform similar tasks. The invention can be practiced using various computer system configurations, such as client server system.

System, method, and apparatus for providing and using a Link Metadata System. The present invention offers a Link Metadata System ("LMS"), available on the Internet, of information associated with any given, specific Internet domain and URL or URI path combination (the "link"). This information includes, but is not limited to, metadata about the content at the link such as the "Content-Type", metadata about the link that contains the screen pixel coordinates of hyperlinks in a bitmap that forms the visually human readable content at the link, links to transcripts of audio found in the content of the link, links to more easily parsable representations of the content at the link (such as for search engines, or different tools used to increase the accessibility of the content to differently-abled sections of the human population, such as people without eyesight), and/or metadata about the link such as a description of the content at the link. Software browsing user agents are then configured with the ability to request information from the LMS and perform actions based on the received information which can include navigation or loading or streaming specific files. In this application, "metadata" and "information" are used interchangeably, where the metadata in the LMS includes a wide range of information in addition to what one skilled in the art would typically refer to as metadata.

Figure 1:
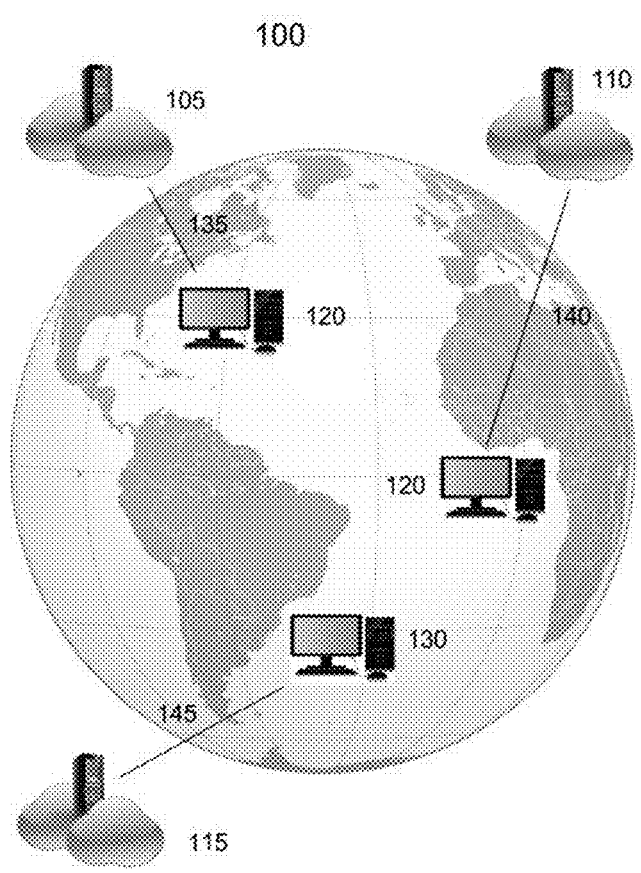
FIG. 1 is a block diagram depicting a plurality of remote servers tuned for delivery of Link Metadata System results and remote client personal computers accessing that service.

FIG. 1 is a block diagram 100 showing client computer devices/apparatuses 120, 125, 130 ("computers") configured to access the LMS by communicating with the geographically closest server device/apparatus 105, 110, 115 for the LMS. In practice, the fastest access may be obtained in some scenarios by accessing a server that is not geographically closest. However, where this is the case, the geographic difference in distance will not be great, unless there is a rare, major outage or service impediment at the geographically closer server or servers. The communication 135, 140, 145 is done via an IP protocol such as TCP, UDP, or HTTP and can be in the form of a request for information or a response with information. The information communicated may include the type of content at the link in question, and alternative representations of the content at the link.

Such client computers 120, 125, 130 include, but are not limited to, personal computers, laptops, smartphones, tablets, connected entertainment devices (such as smart tvs), digital media players, and wearable/implants (computing devices integrated with the human body but capable of displaying desktops or application windows), and data center computers upon which search bots run. Some components of the computers include a CPU, memory (hard disk or solid-state nonvolatile storage, random access memory cache memory, etc.), an operating system ("OS"), and network connectivity with browsing capability.

Search engines benefit from the return of metadata and other information about a link. Such metadata can contain, for example, the coordinates of links on a remote window. This greatly facilitates the search bot's traversal of the web of links, because it does not have to apply pattern recognition to recognize links or semantically search on the page for links. Rather, the coordinates of the links on the "bitmap" of the remote window are listed at a document referenced by the metadata, and the search bot can click them immediately.

The LMS contains a registry of URLs and URIs (URLs and URIs hereinafter referred to collectively as "link addresses"), each associated with a set of information about those links. In order for the LMS to contain the information described above, the information must first be registered with the LMS. For this purpose, the LMS supports one or more software applications (such as a web application, mobile application, or desktop application) that take authenticated submissions of this information in the same general manner as currently done by the Domain Name System ("DNS") used on the Internet and known to those skilled in the art. The LMS is optimized in a manner similar to DNS so that LMS servers would both be located close to end users and any intermediaries such as proxies (collectively referred to as "clients of the LMS"), and would exist in sufficient quantity in various locales, so that clients of the LMS would receive a fast response from the LMS to their queries. Individual LMS servers can be located geographically and exist in numbers, distributed around the Earth, sufficient to provide response time comparable to that offered by the DNS system. LMS lookup is distinct from the DNS lookup because it utilizes the entire link, whereas DNS utilizes only the hostname, and also because the LMS returns information about the link, instead of a translation of a hostname to an Internet Protocol address.

Specifically, the LMS should support fast lookup of complex information, which is why a hash-table-based LMS in fast-access memory such as random-access memory ("RAM"), is a preferred implementation. When new information enters the LMS, re-hashing may need to occur occasionally in order to avoid hash table key collisions. This will introduce update latency (delay from the time of a submission by a user, including a search bot, to the LMS to the time that the new information is served to clients of the LMS), notification of which will need to be provided, as is done presently in the management of the DNS, to entities registering new information with the LMS, so that they can plan their verification of updates accordingly. Other embodiments may use other data structures for the LMS.

The lookup functionality of the present embodiment is distinct from current http-based redirect functionality, such as the http status code of 302 or the similar 303 and 307, and associated header field payload of the alternative link. (Following references will be made only to 302, but the same reasoning holds for 303 and 307). This is for several reasons, one of which is that the 302 response has no specific field for information about the nature of the content at the link, such as if it is a video, or served as a remote application window. Also, the 302 response provides no options that the client may choose from beyond the single redirect link. Finally, the LMS provides superior performance to a 302-based mechanism for retrieving navigational information important to the client, because retrieving a 302 may require (for example in the case of reaching an online software application, such as an e-mail program) triggering the entire application server for the resource, whereas retrieving the information from the LMS involves using a network and associated servers optimized, as is for example the existing DNS, for providing the specific information. Computational overhead associated with application security; user agent session, load balancing for the application; the use of a software platform optimized for portability across operating systems and computer languages, ease of software creation and maintenance instead of speed of execution (as is typical upon application servers, which often run the Java Virtual Machine, Java and/or JavaScript); and the many Internet network hops that would usually be required to reach an application server, would be avoided.

Finally, for efficiency purposes, due to the large use of volatile computer memory, such as random-access memory ("RAM") and its variants, the lookup registry should only include the minimum technical information necessary for the proper display of the requested resources.

In other implementations, DNS itself can be extended to provide access to the LMS, or alternatively the LMS can bundle in any necessary query to DNS and return the result of that query as well. If implemented as an extension of DNS, optimized queries to DNS can omit any request for LMS services where the querying agent was certain that they would not be needed. Additionally, in either implementation with DNS, the querying agent would only need to make one request instead of two if either DNS or the LMS can handle both needs for the additional information by forwarding the request for additional information on to the other respective service.

For example, a lookup server can be resident locally on the same physical or virtual computer that a DNS server is located on. The LMS can also be integrated programmatically into a DNS server itself, so that both share the same operating system application process. In scenarios where a DNS lookup request must be made (which is most of them), this would eliminate all of the network (Internet or otherwise) latency present from the end user (including search bots) to the LMS, which is generally speaking the majority of the latency. In the scenario where DNS would "wrap" the lookup functionality, the DNS system would need to be able to accept a request for LMS services that contained the I.P. address of the domain name in question instead of the domain name itself, in order to process requests for lookup information where the link contains an I.P. address instead of a domain name. A given LMS lookup operation can be accomplished as a sub-operation of the DNS lookup upon the domain name or I.P. address supplied in the link, where the LMS lookup is initiated from or on the DNS server machine itself—or vice-versa, where the LMS lookup additionally performs any DNS lookup, the DNS lookup being initiated from the lookup server machine.

Since the lookup servers will almost always be located much closer (in terms of Internet router hops away) on the Internet network to the DNS servers than the client, significant latency can be avoided by combining the services as described above. In the rare scenarios where the lookup were to be presented, in a given query, with a link that already had the numeric I.P. address coded into it, in place of the text-based domain name, this DNS query would not need to be made.

Figure 2:
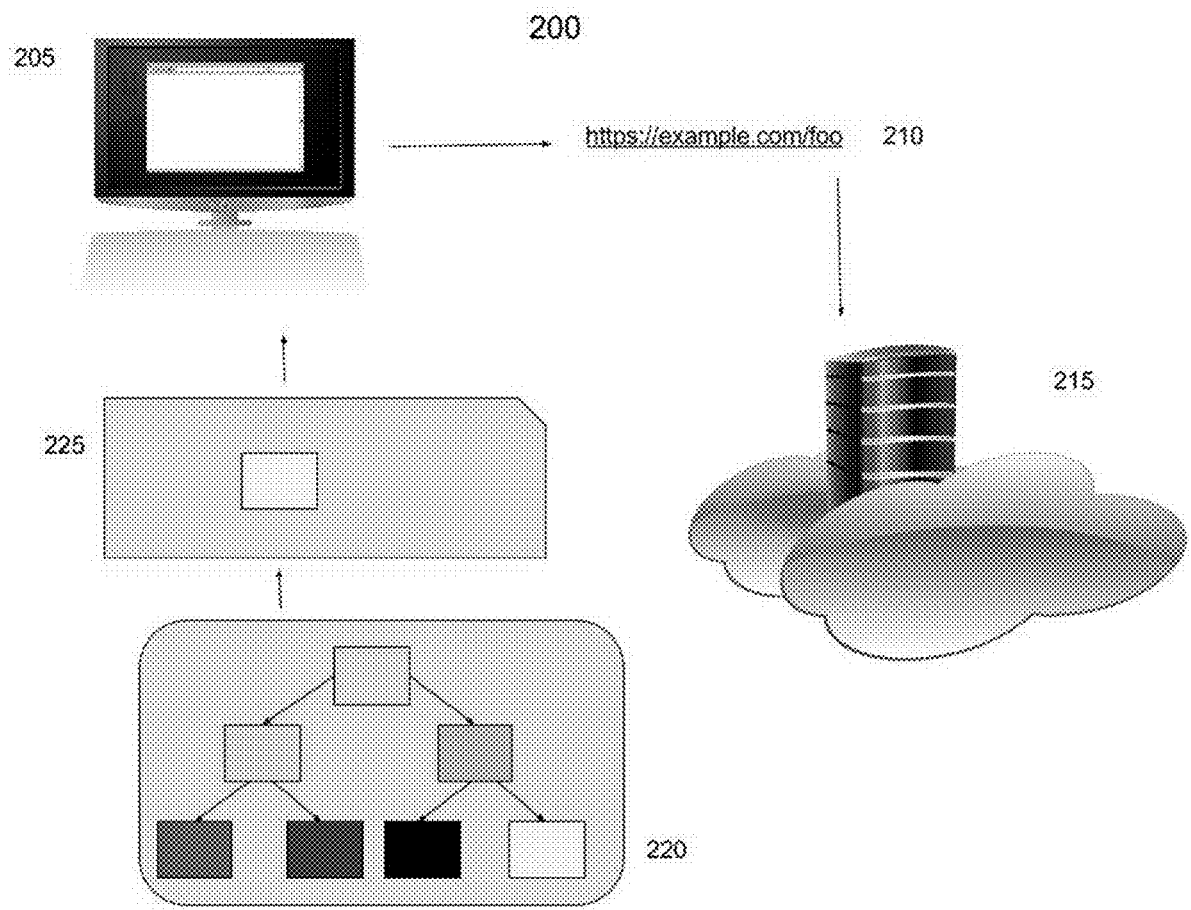
FIG. 2 is a flowchart depicting a general use-case scenario where a user initiates navigation of a link, and then that link is looked up in the Link Metadata System, allowing the user agent to find out if the content at the link is delivered as a video and where a transcript of the video can be found.

FIG. 2 is a flowchart 200 depicting a general use-case scenario where a user initiates navigation of a link on his/her client computer apparatus. The user noted in the above description of FIG. 2 could also be a search bot, instead of a human user. The search bot may supply a parameter, such as "robots: true" in its query to the LMS, and receive back supplementary materials to aid in its parsing of the content. For example, the lookup record for the resource may contain the link addresses to documents summarizing the content in plain text. Or, in the case where the content were presented as a bitmap, the resource may contain the link addresses to structured documents describing the coordinate location of key elements (such as further hyperlinks) in the bitmap that represents the resource. In the bitmap case where the sought-after elements were hyperlinks, this would enable the search bot to quickly "spider" or visit those hyperlinks since it would reduce greatly the use of computational resource required to search through the bitmap for such links. Similarly, also in the bitmap case, the coordinates of text blocks and images could also be supplied, enabling the search bot to snapshot the images and quickly load blocks of text in for processing.

The user's web browser 205 (broadly termed, the user's "user agent") receives the user's command to navigate the link 210. It next creates its query for the LMS 215 that is resident on a server computer apparatus. In this example, the query is transported via http, but other network transport protocols can be used as well. The request, containing the whole link, is sent to the LMS 210 using the web browser's standard machinery for dispatching an http request, as described below.

The following parts of the link address and their respective values are isolated ("the isolation") at the server, based on the incoming link address. To reduce the potential for implementation errors on the various types of clients for the straightforward and non-computationally-intensive link address parsing task, the isolation is done on the server in the preferred embodiment. Where the query term isolation occurs on the server, the link itself is composed by the client into a standard http 'get' query, and http-encoded so that it can function properly as such. The parts of the link address can include the scheme (for example, http, https, ftp), the domain (or subdomain) name or literal numeric IP address, the port number, and the path (such as "an/example" in "https://example.com/an/example"). The values extracted from the link address are referred to as the "query terms".

In other embodiments, the isolation of the query terms can occur on the client. In this embodiment, the LMS would accept an http protocol-based query, such as an http 'get' query, with the individual query terms discussed above provided separately in the form of key-value pairs, instead of being sent together as a single query term in the form of an http-encoded link address. Thus, the content of query would instead be, for example: "scheme=https&domain=example.com&path=foo." Or, alternatively in a data-transfer minimizing protocol for the LMS, the content of query would instead be, for example: "sc=https&dn=example.com&ph=foo." The query to the LMS is optimized by shortened textual codes for the standard parts of the query, such as the scheme (including protocol) and the type of information queried. When the lookup server 215 receives the query, it proceeds as normally, except that it does not need to isolate the query terms. Notably, the use of the http 'get' method offers the benefit of http standard cache control, so that unnecessary lookups of the query can be avoided, lessening load on all systems.

In either embodiment, query term isolation on the client or on the server, the client's query may optionally contain an indication that the client would like to receive a certain kind of information about the resource at the link address, such as the content type. Optimally, the LMS will conform to standards of art such as the MIME Internet standard, so that a query for content type can be specified as "Content-Type" and the response will be a valid MIME content type such as "video/mp4". Any abbreviation of "Content-Type" for the purposes of efficiency would map to "Content-Type".

When the LMS receives the query, it consults its registry in order to find the requested information, using the query terms. The registry can exist in a computer readable medium on the server, such as fast random-access memory. The registry takes as its query parameters, at a minimum but not limited to, a given fully-qualified link address and the type of information requested. The query parameters are grouped into two groups, the link address part and the information type requested part, but the total number of groups is not limited to only two. The type of information is specified similarly to the specification for a link address: Any parameter supplied to the query must conform to this specification. For example, for efficient Internet traffic (less data to transmit), the characters "ct" will stand for "Content-Type".

In a preferred embodiment, the LMS then looks up that link by using a data structure 220 and a permissive lookup approach that is based on successive lookup in hash tables. The permissive lookup approach is a configuration that enables the LMS responses to supply a default result set in the case where the client does not specify exactly what information is requested of the LMS. In this permissive lookup approach, if the scheme is omitted, http is used, and if that fails, https is used. If no entries for "http" or "https" exist in the registry for the given link address, then that selector (scheme) is not used. If the port is omitted, the default port for the scheme is used, such as 80 for http and 8080 for https. And similarly, if no entries for the port number exist in the registry entry for the given link address, then the port number selector is not used. The same approach is used for any other selectors other than the top-level Internet domain name selector. The top-level Internet domain name selector selects for values such as "example.com".

An example of the data structure 220 represented in JavaScript Object Literal Notation ("JSON") format follows:

```
{
    "example.com": {
        "foo": {
            "Content-Type": "video/mp4",
            "transcript": "/transcripts/1a"
        }
    }
}
```

Note that in the example code given above, many other keys in addition to "foo" can exist (such as "bar", or any other key name than "foo"). These would hold data for different object path combinations such as link address paths or http port number.

The lookup operates by first finding the domain name, such as 'example.com' in a data structure 220, which, in the preferred embodiment, is a true hash-table of domain names (such as the parent object of 'example.com') that will provide a large reduction in lookup space for the next lookup. Then the lookup finds each term of the path, such as 'foo,' in the data structure 220, in order as a successive set of nested true hash-tables, forming a tree of hash tables, and finally checks for any specific scheme or port assignment. Any specific scheme and port would be represented, nested successively, as a descendent property of 'foo.'

The LMS 215 responds with a part 225 of the tree of hash tables data structure 220, although no restriction to a tree data structure is implied here. The payload, in one implementation, would be a JSON data structure. The LMS responds to the http 'get' request with a payload including the response to the specific type of information requested, Returned Item 225. Returned Item 225 is the value of the last available lookup property in the data structure 220, 'foo', because the lookup picks the value of the last available lookup property. Recall that 'foo' is the path element of the URL. Example code of Returned Item 225 follows:

```
{
    "Content-Type": "video/mp4",
    "transcript": "/transcripts/1a"
}
```

Notice that the above code is the same as the value of "foo" in the previous code example.

The user agent receives the returned item and, depending upon the client type, performs actions dependent upon the information contained in the payload 225. The element contained in the Returned Item 225 of the response payload is processed by the user agent 205. For example, if the client is a web browser and the content type is video/mp4, the web browser may provide captions and/or subtitles if the response includes a link to a transcript. The user agent may use this value to present a transcript, or the option to access a transcript, of an mp4 video to the user. The transcript can also be used to provide subtitles or a transcript that plays according to the position of the mp4 video. A search engine user agent may choose to skip downloading the mp4 because it is difficult to parse, and simply download the transcript instead.

The LMS can present the client with one or more alternative link addresses to the original one, allowing the client in a client-server relationship to choose the representation of the desired resource that best suits it, rather than relying upon the server or client-type detecting software loaded from a server to do the same. The LMS can present the client with one or more alternative link addresses to the original one, allowing the client in a client-server relationship to optionally choose supplementary resources to the original one.

If there is no data corresponding to the specified query available in the LMS registry, an empty response is sent, which in JSON would be:

{ }

That is, an empty pair of curly braces.

Figure 3:
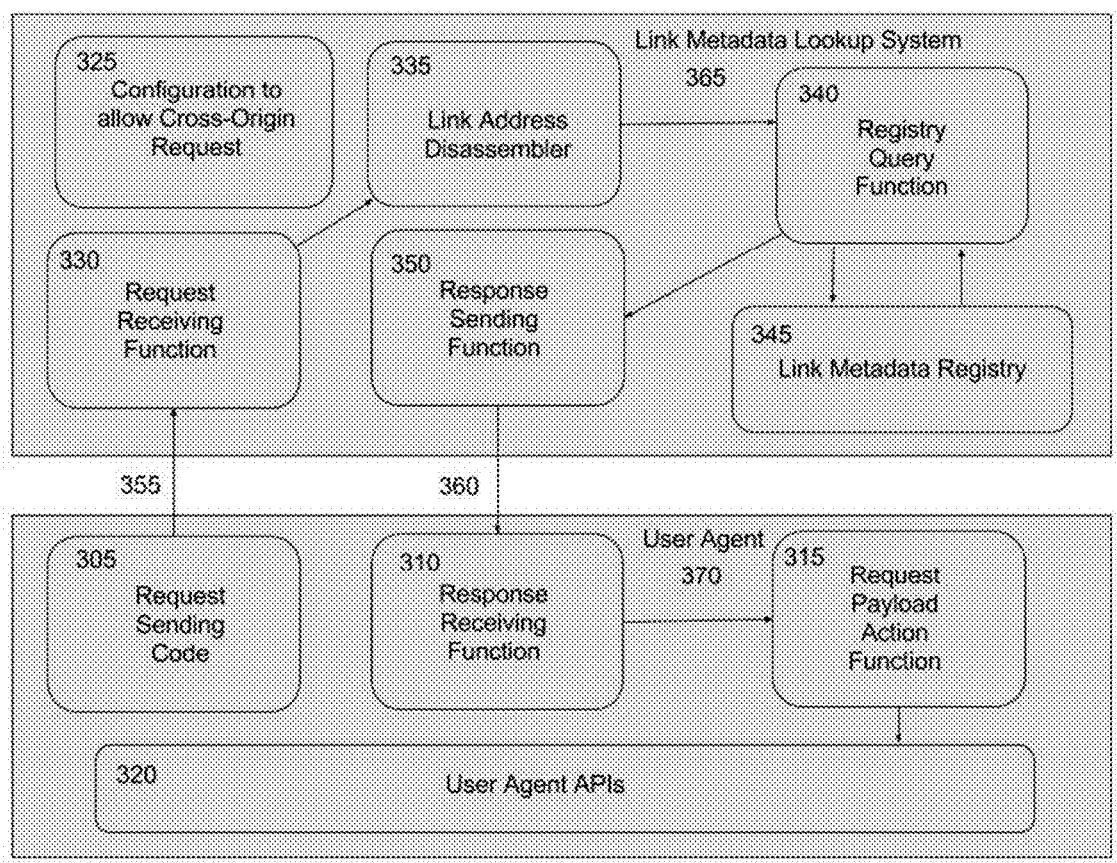
FIG. 3 is a block diagram of a general system embodiment showing how the Link Metadata System and the user agent function to determine metadata about a link.

FIG. 3 is a block diagram 300 showing a general system embodiment where the LMS 365 on the server apparatus and the User Agent 370 on the client apparatus are configured to determine metadata about a link. In order to effect this lookup, upon navigational action, the User Agent 370 (such as a web browser) would send a query to the lookup service. This would typically be done over the Internet, using http, as an http 'get' request 355. While various tooling exists to make this more convenient, the underlying operation can be done as shown in the following JavaScript software code for:

```
Request Sending Code 305
var req=new XMLHttpRequest( );
req.addEventListener("load", requestListener);
req.open("GET", "https://www.someServiceUrl.com/lm-
    s?uri="+encodeURIComponent("http://example.com/
    foo/bar?=foo&bar=bat"));
req.send( );
```

In the Request Sending Code 305, the code 'encodeURIComponene' (known to those skilled in the art) is given the link metadata query as its argument. This ensures that any parameters inside the link metadata query (the link address, and associated sub-components) that is passed to the LMS are not seen by the LMS as parameters to the LMS outside of the link metadata query. Also notably, the resource at the "www.someServiceUrl.com" link address should be configured with Cross-Origin Resource Sharing in order for the XmlHttpRequest above to work, unless the request is done to a LMS embodiment that does not require the same (such as the embodiment described above where the LMS is integrated with the DNS) and the XmlHttp request functionality or its equivalent will accept such usage for the LMS endpoint.

The LMS is configured with the capability of looking up the fully-qualified link address sent to it, as in the above example, and returning any stored information regarding that link address. Receiving the response 360 from the LMS can be done as shown in the following JavaScript software code for:

```
Response Receiving Function 310
function requestListener ( ) {
    var linkMetadata = JSON.parse( this.responseText );
}
```

In the Response Receiving Function 310, once the link metadata object is received, any metadata values that are needed can be accessed.

To receive the query, first the LMS 365 utilizes a Request Receiving Function 330, similar to Response Receiving Function 310. While the implementation can be done via various frameworks ("tooling") and computer languages, here a JavaScript implementation is described. Similarly to how Request Sending Code 305 uses 'encodeURIComponent', Request Receiving Function 330 uses the built-in JavaScript function 'decodeURIComponent' to turn the link in question into plain text, along with any other specific queries, such as one for 'Content-Type'. Many server toolsets may do this automatically. Then, in the preferred embodiment where the query term isolation is done on the server, Request Receiving Function 330 sends the plain text onward to the Link Address Disassembler 335, which splits the link address into its constituent parts as described above. In the embodiment where the query term isolation is done on the client, these parts are already available, since the Link Disassembler 335 already operated, running on the client. Next, the link address Disassembler 335 sends these parts onward to the Registry Query Function 340.

The Registry Query Function 340 first performs a hash table-based lookup upon the Link Metadata Registry 345 using the fully-qualified domain name item of the link constituent parts. This provides the greatest reduction in lookup scope, making subsequent hash-table (or other) lookups faster because their search space is accordingly smaller. Next it looks up the port segment, if any. If there is no port specified in the lookup table, the lookup can proceed, instead of returning an empty response, in order to allow metadata authors an implicit way to provide metadata for all ports. Next it looks up the first path segment, if any, and then the next, and so on until no further path segment exists or is found. Next, it looks up the scheme (such as 'http' or 'https'), applying the same matching requirement as it does with the port number, so that in the case where no matching entries for scheme are provided, that lookup step is ignored, allowing any scheme to (effectively) "match". This ordering of lookup (fully-qualified domain name, port segment, path, and so on) is a preferred embodiment because it will provide an early reduction in scope for most URLs or URIs in use today, and alternative implementations may vary the ordering. Similarly, alternative implementations may break up the scoping of the lookup reduction so that, for example, the top-level domain (such as "com", "org", "biz", "us", and so forth) forms the first level, and so on with each next domain segment making up another scope level. And similarly, alternative implementations could combine one or some segments therein. However, the preferred embodiment described in detail here will provide the best performance because the run-time speed cost of the object reference hop from a higher scope to the next scope is greater than the run-time speed cost of a lookup in the larger hash-table that would hold the fully-qualified domain names. Finally, the Registry Query Function 340 returns the value of the final match, which in this implementation is a JSON object that serves as the data payload of the response.

This value is returned to the Response Sending Function 350, which can be implemented similarly to Request Sending Code 305. The standard security mechanism that is applied in server software to outbound responses provides a "pass" to the outbound response, because the server has been configured properly according to the Cross-Origin Request rules by the Configuration to allow Cross-Origin Request 325. Therefore, the Response Sending Function 350 sends the response to the Response Receiving Function 310 of User Agent 370.

The Response Receiving Function 310 sends the JSON data payload to the Request Payload Action Function 315. It determines what the User Agent 370 should do based upon the content of the data payload response. For example, if the "Content-Type" field of the data payload response is "video/mp4", and there is an accompanying value for a "transcript" field alongside it in the payload, then the User Agent 370 may offer an option to view a transcript of the video, such as a supplementary web page with a fully hyperlinked transcript with images, because the User Agent 370 knows from the LMS response that such a resource is available for download.

The preceding description contains embodiments of the invention and no limitation of the scope is thereby intended.

That which is claimed is:

1. A computer-implemented method comprising:
   receiving any navigational action by a user on any link, by a client web browser;
   in response to any navigational action by a user on any link, sending, by the client web browser using its standard http request functionality, an http get query for information to a lookup server wherein the query includes a URI of the link;
   in response to any navigational action by a user on any link, extracting, on the lookup server, values from the URI in the query, corresponding to domain and any other URI components that comprise the URI;
   in response to any navigational action by a user on any link, looking up information in a lookup server registry using a series of successive, search-scope reducing lookups using the extracted domain and the any extracted URI components;
   receiving, by the client web browser, from the lookup server, a response with a payload of data representing requested information.

2. The method of claim 1 further comprising:
   after receiving a response with a payload of data representing the requested information, processing, by the client web browser, the payload of data and performing an action in response.

3. The method of claim 1, wherein the user on the client web browser is a human user.

4. The method of claim 1, wherein the user on the client web browser is a search engine web crawler.

5. The method of claim 1, wherein the lookup server resides on the same physical or virtual computer as a DNS server.

6. The method of claim 1, wherein the lookup server is integrated programmatically into a DNS server, or vice-versa.

7. The method of claim 1, wherein the query includes a specifier for a type of information that is being requested.

8. The method of claim 1, wherein the series of lookups uses the top-level domain for a first lookup and then uses any URI components in order from most-general to most specific for each successive, search-scope-reducing lookup.

9. A Link Metadata System comprising at least one processor, the at least one processor configured to cause the system to at least perform:
   receiving any navigational action by a user on any link, by a client web browser;
   in response to any navigational action by a user on any link, sending, by the client web browser using its standard http request functionality, an http get query for information to a lookup server wherein the query includes a URI of the link;
   in response to any navigational action by a user on any link, extracting, on the lookup server, values from the URI in the query, corresponding to domain and any other URI components that comprise the URI;
   in response to any navigational action by a user on any link, looking up information in a lookup server registry using a series of successive, search-scope reducing lookups using the extracted domain and the any extracted URI components;
   receiving, by the client web browser, from the lookup server, a response with a payload of data representing requested information.

10. The system of claim 9 further comprising:
    after receiving a response with a payload of data representing the requested information, processing, by the client web browser, the payload of data and performing an action in response.

11. The system of claim 9, wherein the user on a client web browser is a human user.

12. The system of claim 9, wherein the user on a client web browser is a search engine web crawler.

13. The system of claim 9, wherein the lookup server resides on the same physical or virtual computer as a Domain Name System server.

14. The system of claim 9, wherein the lookup server is integrated programmatically into a Domain Name System server, or vice-versa.

15. The system of claim 9, wherein the query includes a specifier for a type of information that is being requested.

16. The system of claim 9, wherein the series of lookups uses the top-level domain for a first lookup and then uses any URI components in order from most-general to most specific for each successive, search-scope-reducing lookup.

* * * * *